United States Patent [19]

Graczyk

[11] 4,429,431
[45] Feb. 7, 1984

[54] WINDSHIELD WIPER ARM TO BLADE CONNECTOR

[75] Inventor: Bronislaus S. Graczyk, Buffalo, N.Y.

[73] Assignee: Trico Products Corporation, Buffalo, N.Y.

[21] Appl. No.: 320,461

[22] Filed: Nov. 12, 1981

[51] Int. Cl.$^3$ .............................................. B60S 1/40
[52] U.S. Cl. ............................................... 15/250.32
[58] Field of Search ........................ 15/250.32–250.42

[56] References Cited

U.S. PATENT DOCUMENTS

| 4,142,268 | 3/1979 | Brown et al. | 15/250.32 |
| 4,214,343 | 7/1980 | Dudek | 15/250.32 |
| 4,293,974 | 10/1981 | Gowens et al. | 15/250.32 |

Primary Examiner—Peter Feldman
Attorney, Agent, or Firm—E. Herbert Liss

[57] ABSTRACT

A monolithic body is provided with contours on its side surfaces which are configured, sized and positioned to fit securely between and to seat depending ears of a slotted saddle type wiper arm for adapting the wiper arm to accept a side mounted wiper blade having a transverse pin receiving opening. A detent coacting with the arm retains the body in position; a cantilever pin projecting from the side surface of the body is adapted to be received and detachably retained within the wiper blade receptor formed by the pin receiving opening.

9 Claims, 15 Drawing Figures

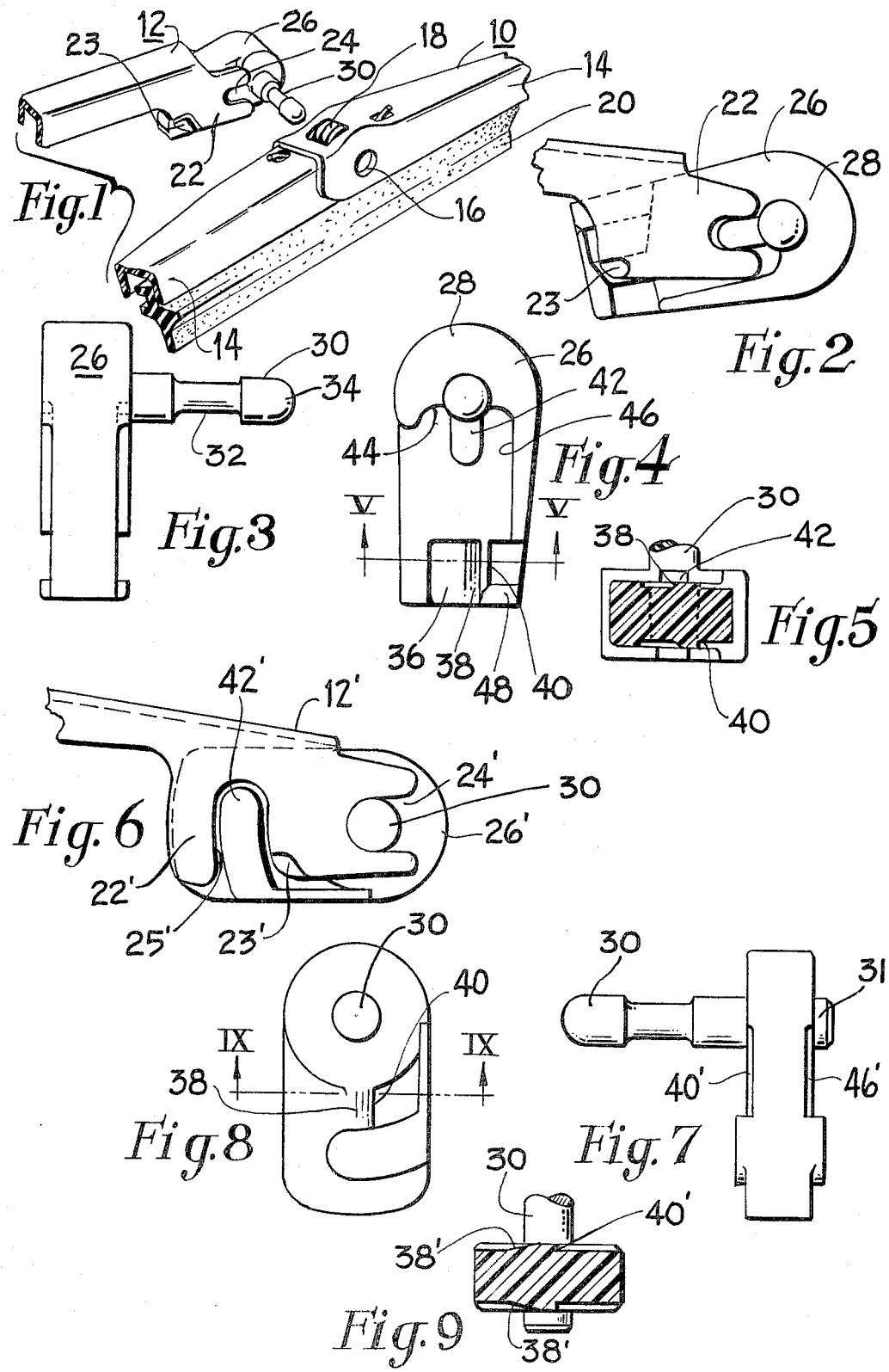

WINDSHIELD WIPER ARM TO BLADE CONNECTOR

BACKGROUND OF THE INVENTION

The invention relates to a coupler for securing a windshield wiper arm to a windshield wiper blade and, more particularly, to an adaptor for converting a saddle type arm to a cantilever pin type arm.

There are various known adaptors for converting an arm designed for one type of arm to blade attachment to one designed for another type of coupling means. Among these are the adaptors disclosed in U.S. Pat. No. 4,214,343 to Dudek and U.S. Pat. No. 4,023,232 to Smithers which disclose adaptors for connecting hook type arms to pin type blades. There is also a body of prior art disclosing means for coupling bayonet type arms to pin type blades and vice versa.

Currently, a slotted saddle type arm as shown in U.S. Pat. No. 4,293,974 to Gowans et al is coming into use on certain newer model vehicles. The cantilever pin type blade arm to blade connection shown in U.S. Pat. No. 3,378,874 is a conventional type of blade widely sold in the replacement market as well as for original equipment. None of the prior art adaptors are capable of converting a slotted saddle type arm to one which will accept a cantilever pin type arm.

The novel and unique adaptor of this invention is designed to accommodate blades designed for cantilever pin type arm to blade connectors; a monolithic body member is securely retained and fits snugly between the depending ears of a slotted saddle type arm tip; it includes a transversely extending cantilever pin for connecting the arm to a side mounted blade which is adapted to receive the cantilever pin. The side surface of the body are configured, sized and positioned to conform to and seat the depending slotted ears in interlocking engagement to thereby prevent vertical or horizontal displacement. Detents are provided to deter rotational displacement.

SUMMARY

The principle object of the present invention is to provide a compact, inconspicuous adaptor for converting a slotted saddle type arm to blade connector to a pin type blade connector.

Another object of the invention is to provide an adaptor for an arm to blade connector which is simple to install, securely retained and readily removable and which provides a firm arm to blade connection.

Other objects and advantages of the invention will be apparent from the following detailed description taken in connection with the accompanying drawings.

DESCRIPTION OF THE DRAWINGS

FIG. 1 is an exploded partial perspective view of an arm and blade incorporating one embodiment of the invention;

FIG. 2 is a side elevation view of an adaptor partially assembled with an arm;

FIG. 3 is a top elevational view of the invention;

FIG. 4 is a side elevational view of the invention;

FIG. 5 is a cross section taken on line V—V of FIG. 4;

FIG. 6 is a side elevation view of another embodiment of the invention in operative assembly;

FIG. 7 is a top elevation view of the embodiment of the invention shown in FIG. 6;

FIG. 8 is a side elevation view of the FIG. 6 embodiment;

FIG. 9 is a cross section taken on line IX—IX of FIG. 8;

DETAILED DESCRIPTION

Figure 10:
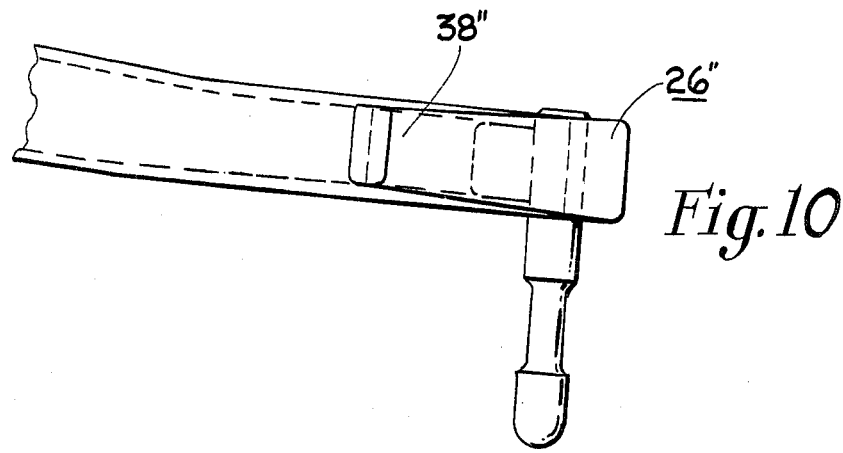
FIG. 10 is a top elevational view of yet another embodiment of the invention.

Referring to the drawings and in particular FIGS. 1 to 5 a central fragment of a windshield wiper blade 10 is shown which connects to the end 12 of a windshield wiper arm. The wiper blade is a conventional blade comprising a pair of levers 14 pivotally connected at their adjacent ends by a tubular element 16 forming a tubular receptor which extends transversely through aligned openings in the levers. Encircling the tubular element 16 is a coil spring 18 arranged to transmit pressure to the resilient wiping element 20 received from the wiper arm. Other and different types of conventional wiper arms of metal or plastic having a transverse central opening for reception of a wiper arm pin and detent mechanism for retaining it may be employed. The wiper arm comprises a mounting head (not shown) for attaching the arm to a pivot shaft and an arm extension (not shown) pivoted to the mounting head on a transverse axis terminating in arm tip 12 U-shaped in cross section forming depending ears 22. The depending ears each have a slot 24 for accomodating a cross pin in a blade and depressions 23 at the lower inner end to engage a portion of the blade for limiting inadvertent rotational displacement as shown in U.S. Pat. No. 4,293,974 to Gowans et al.

The adaptor 26 of the invention comprises a solid unitary monolithic block preferably of a tough plastic material. The block from which the adaptor 26 is formed has a transverse dimension such that it will fit snugly between the ears 22 of the arm tip 12. The side surfaces have contoured embossments configured, sized and positioned to conform to the shape of the depending ears 22 so that the exposed side surfaces of the adaptor 26 are essentially co-planar with the outer surfaces of the depending ears 22. The adaptor 26 includes a nose portion 28 having a cantilever pin 30 mounted, formed or otherwise secured therein extending laterally from one surface. The cantilever pin 30 has a central circumferentially recessed portion 32 and a rounded or tapered free end 34. A rectangular recess 36 is provided at the inner, lower edge (lower right as viewed in FIG. 4). The rectangular recess 36 is formed with a ramp 38 extending longitudinally of the adaptor. Within the rectangular recess 36 the ramp 38 terminates in a shoulder or abutment 40.

The embossments or contours are best seen in FIG. 4. An embossment 42 conforming to the shape of the slot 24 extends radially and rearwardly from the pin 30. The nose portion forms a rearwardly facing shoulder 44 shaped to conform to the formed tips of the depending ears 22. The lower edge of the adaptor 26 (the righthand side in FIG. 4) is formed with an embossment forming a lower shoulder 46 conforming to the shape of the lower edge of the depending ears 22 when the slot 24 engages the configuration 42. The rear edge of recess 42 (lower edge in FIG. 4) is provided with a flange 48 to engage the rear edge of the depending ears 22. The upper edge of the adaptor shown at the lefthand side of FIG. 4 is of a width to fit snugly between the ears 22.

The adaptor is assembled to the arm tip by inserting the upper edge at an angle as shown in FIG. 2 until the slot engages the embossment 42. The adaptor is then rotated clockwise from the position shown in FIG. 2 to the position shown in FIG. 1 with the depressions or indentations 23 at the lower rear edge of the arm tip riding over the ramp 38 and engaging in the rectangular recesses 36 behind the shoulder or abutment 40. It should now be readily apparent that the embossments and shoulders prevent inadvertent horizontal and vertical movement of the adaptor relative to the arm tip the engagement of the indentations 23 with the shoulder 40 deters inadvertent rotation of the adaptor and forms a detent for retaining the adaptor in assembly with the wiper arm tip.

The embossments and shoulders together with the outer surface of the arm tip 12 form an essentially coplanar surface and provide a secure, unobtrusive and compact adaptor which can be readily removed by applying sufficient counterclockwise rotation to release the detent. The force required to rotate the adaptor beyond the shoulder 40 is greater than any force encountered during operating conditions. A pin type blade such as the blade 10 shown in FIG. 1 or a blade with an equivalent transverse receptor can be attached to the arm by thrusting the pin 30 through the transverse receptor 16 or equivalent aligned openings and is retained by engagement of the spring 38 in the recessed portion 32. In some equivalent conventional blades a leaf spring lever type latch engages the recess 32.

Certain arms of the slotted saddle type include in addition to a forwardly opening slot 24' in arcuate slot 25' opening at the lower edge of the depending ears. Such an arm tip 12' is shown in FIG. 6. Further the forwardly opening slot 24' and the depending ears 22' may be enlarged to a size which can accomodate the inner end of the cantilever pin 30. In this version of the arm tip 12' the indentations 23', corresponding to indentations 23 on the FIG. 1 to 9 embodiment, are located at the lower edge of the depending ears adjacent the forward edge of the arcuate slot 25' as seen in FIG. 6. In this embodiment the adaptor 26' is of width to fit snugly between the depending ears. The pin 30 is positioned to engage at the closed end of the slot 24' and has a stub end 31 on the opposite surface. An arcuate embossment 42' configured and sized to correspond to the slot 25' is provided and is concentric with the cantilever pin 30. A ramp 38' terminating in a shoulder or abutment 40' is provided adjacent the embossment 42' between the embossment 42' and the pin 30. Flanges 46' are provided to form lower shoulders.

This embodiment is secured to the arm tip by engaging slot 24' with the inner end of pin 30 and the stub 31 on the opposite surface. The adaptor is rotated until the arcuate embossments 42' fully engage the slots 25' and the indentations 23' ride down the ramps 38' and engage the shoulders 40' to the position shown in FIG. 6. The lower edge of the depending ears 22' engage the lower shoulders 46'. Thus it can be seen that again the embossments together with the pin prevent horizontal and vertical movement of the adaptor 26' relative to the arm tip 12', and the ramp end 38' forming the shoulder or detent 40' coacting with indentation 23' deters inadvertent rotational movement.

It is now apparent that the arm is equipped to accept a blade with a pin type arm to blade receptor in a manner similar to that of the embodiment described and shown in FIGS. 1 to 5.

Figure 11:
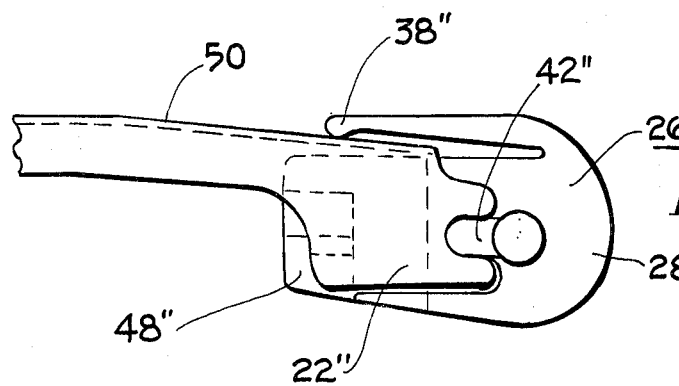
FIG. 11 is a view similar to FIG. 6 illustrating the FIG. 10 embodiment of the invention.
Figure 12:
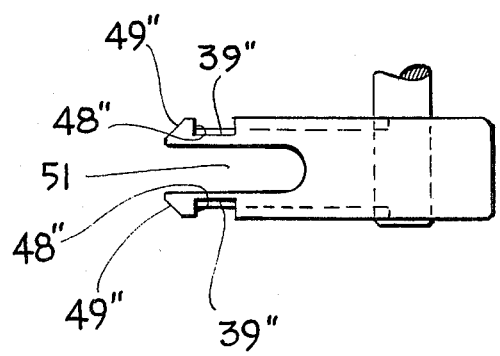
FIG. 12 is a bottom plan view of the embodiment illustrated in FIG. 10.

To accomodate arm tips the depending ears of which are not equipped with the indentations such as 23 or 23', detent means in lieu of or in addition to the shoulder 40 or 40' may be provided. In the embodiment shown in the FIGS. 10 through 12, an adaptor 26'' is provided with a spring finger 38'' extending from the nose portion 28'' rearwardly across the upper surface of the body and bears against the upper surface 50 of the arm tip. The rear end of the body may be recessed as at 51 to form a pair of resilient fingers or detents 39'' having shoulders 48'' which engage the rear edges of the depending ears 22''. The shoulders 48'' correspond to rear shoulder 48 as illustrated in the FIG. 3 embodiment. In the instant embodiment the adaptor 26'' is inserted by means of a horizontal thrust movement into slot 24''; slot 24'' engages the embossment 42'' which is shaped, sized and positioned to conform to slot 24''. The depending flanges 22'' ride on the inclined surface 49'' on the external surface of the shoulders 48'' whereupon the resilient fingers 39'' at the rear of the body which carry shoulders 48'' collapse to cause the shoulders 48' to snap behind the rear edge of the depending flanges 22''. The spring finger 38'' prevents inadvertent rotational movement. The engagement of the depending ears 22'' between pin 30 and shoulders 48'' prevent inadvertent horizontal and vertical displacement.

Figure 13:
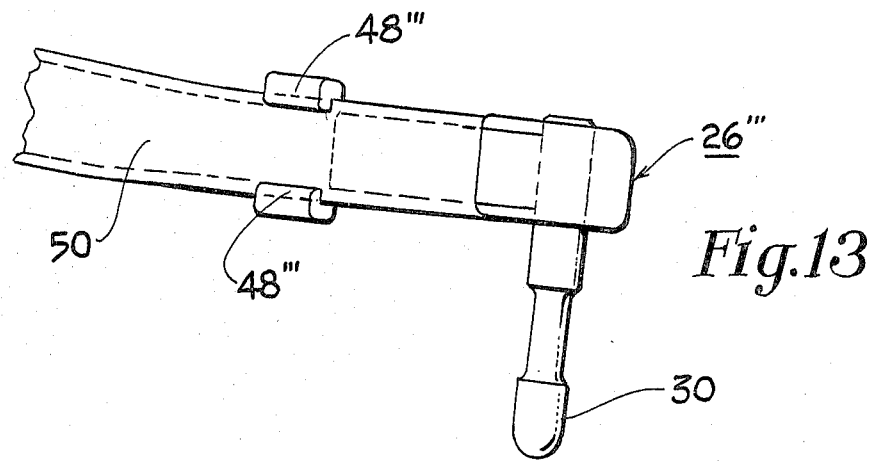
FIGS. 13, 14 and 15 are views similar to FIGS. 10, 11 and 12, respectively, of another embodiment of the invention.
Figure 14:
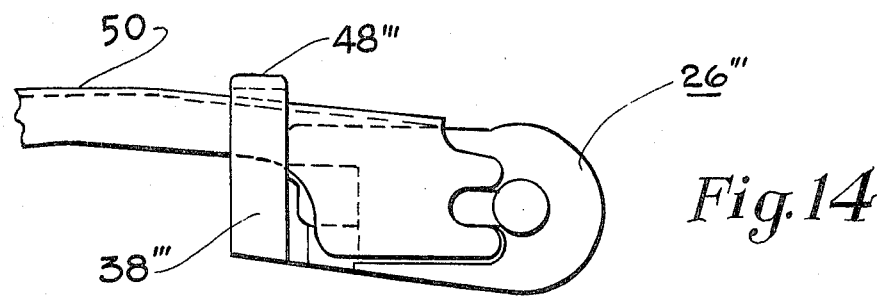
Figure 15:
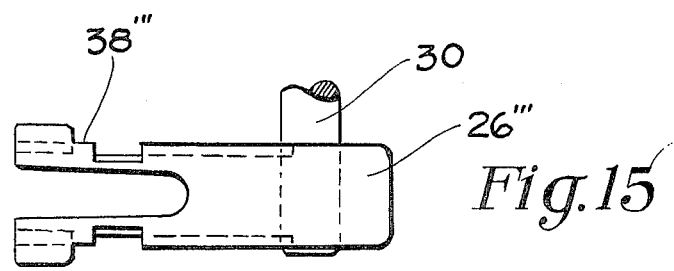

The embodiment shown in FIGS. 13 through 15 illustrates yet another detent means. Adapter 26''' is substantially identical to the embodiment illustrated in FIGS. 1 to 5 but for the addition of a pair of vertically, upwardly extending resilient locking fingers 38''' disposed at the rear. At the free end of each of the locking fingers 38''' is a shoulder 48''' which snaps into engagement with the web 40 of the arm tip 12. When the arm tip 12 is rotated into position in a manner similar to the FIG. 3 embodiment the shoulders 48''' engage the web 50 of the arm tip 12 to prevent inadvertent rotation and displacement of the adaptor 26'''. It will be apparent that the locking fingers 38''' can also be utilized with the embodiment illustrated in FIGS. 6 through 9.

It will be apparent that a unique and novel adaptor for an arm to blade connector has been provided which converts a slotted saddle type arm tip to a cantilever pin type arm tip in a neat and unobtrusive manner. The adaptor is simple to assemble with the arm tip and is readily removable, yet secure against inadvertent removal during use.

Although certain specific embodiments have been shown and described for the purpose of illustration it should be apparent that, in accordance with the broader aspects of the invention, various modifications and other embodiments are possible within the scope of the invention. For example, other and different types of detent means may be employed. It is to be understood, therefore, that the invention is not limited to the specific arrangements shown but in its broadest aspects it includes all equivalent embodiments and modifications which come within the scope of the invention.

What is claimed is:

1. An adaptor for detachably coupling a windshield wiper arm to a windshield wiper blade of the type having a transverse opening for receiving a cantilever pivot pin mounted on the arm tip to the end of a windshield wiper arm of the type which includes an arm tip including a web portion having spaced depending ears, said spaced depending ears having at least one open ended slot adapted to receive a transverse pin laterally spanning the central portion of the wiper blade; said adaptor comprising a unitary body having opposite parallel external side faces of a width to fit snugly between the spaced depending ears of the arm, said unitary body having a generally flat top surface, said parallel side faces including elevated portions engageable with said slots to firmly fix the adaptor body in position between the depending ears, said elevated surfaces forming recesses complementary to the shape of an engageable in nested relationship with said depending ears, said body including a nose portion having a cantilever pin projecting substantially perpendicular to the side faces and insertable and retainable in a transverse opening of a wiper blade.

2. An adaptor according to claim 1 having detent means to engage the arm to prevent inadvertent displacement of said adaptor.

3. An adaptor according to claim 1 or 2 wherein each of said side faces includes an elevated side portion extending radially and rearwardly from said cantilever pin, positioned, configured and sized to firmly engage a slot which is open at the free end of the arm.

4. An adaptor according to claim 1 or 2 wherein said cantilever pin includes a portion adjacent one face and a stub portion projecting from the opposite face positioned and sized to receive a slot which is open at the free end of said arm.

5. An adaptor according to claim 2 wherein said detent means comprises a spring finger extending rearwardly from the nose portion, spaced from and overlying the top surface to resiliently engage the web portion of the arm tip.

6. An adaptor according to claim 2 or 5 wherein the body includes a recessed rear portion to form a pair of resilient fingers having forwardly facing shoulders to engage the rear edge of said depending ears.

7. An adaptor according to claim 2 wherein said detent comprises a pair of upwardly extending resilient locking fingers having shoulders for engagement with the web of the arm tip.

8. An adaptor according to claim 4 including an arcuate elevated surface concentric with said pin.

9. An adaptor for detachably coupling a windshield wiper arm to a windshield wiper blade of the type having a transverse opening for receiving a cantilever pivot pin mounted on the arm tip to the end of a windshield wiper arm of the type which includes an arm tip including a web portion having spaced depending ears, said spaced depending ears having at least one open ended slot adapted to receive a transverse pin laterally spanning the central portion of the wiper blade; said adaptor comprising a unitary body having opposite parallel external side faces of a width to fit snugly between the spaced depending ears of the arm, said unitary body having a generally flat top surface, said parallel side faces including elevated portions engageable with said slots to firmly fix the adaptor body in position between the depending ears, said elevated surfaces forming recesses complementary to the shape of and engageable in nested relationship with said depending ears, said body including a nose portion having a cantilever pin projecting substantially perpendicular to the side faces and insertable and retainable in a transverse opening of a wiper blade and detent means to engage the arm to prevent inadvertent displacement of said adaptor comprising a ramp terminating in a shoulder positioned to engage an indentation on the depending ears of the arm tip.

* * * * *